United States Patent
Kanno

[19]

[11] Patent Number: 6,063,467
[45] Date of Patent: May 16, 2000

[54] OPTICAL RECORDING MEDIUM

[75] Inventor: Toshiyuki Kanno, Kawasaki, Japan

[73] Assignee: Fuji Electric Co., Ltd., Kanagawa, Japan

[21] Appl. No.: 09/028,046

[22] Filed: Feb. 23, 1998

[30] Foreign Application Priority Data

Feb. 24, 1997 [JP] Japan .................................. 9-039472
Apr. 10, 1997 [JP] Japan .................................. 9-091982

[51] Int. Cl.$^7$ ....................................................... B32B 3/00
[52] U.S. Cl. .................... 428/64.1; 428/64.2; 428/64.4; 428/64.8; 428/457; 428/913; 430/270.14; 430/495.1; 430/945; 369/283; 369/288
[58] Field of Search .................................. 428/64.1, 64.2, 428/64.4, 64.8, 457, 913; 430/270.14, 495.1, 945; 639/283, 288

[56] References Cited

U.S. PATENT DOCUMENTS

| | | |
|---|---|---|
| 2,112,139 | 3/1938 | Brooker et al. . |
| 2,112,140 | 3/1938 | Brooker et al. . |
| 2,734,900 | 2/1956 | Heseltine . |
| 2,887,479 | 5/1959 | Heseltine . |
| 3,410,848 | 11/1968 | Rauch et al. . |
| 4,987,021 | 1/1991 | Kanno .................................. 428/64.1 |
| 5,019,476 | 5/1991 | Kanno .................................. 430/20 |
| 5,667,860 | 9/1997 | Burns et al. ........................... 428/64.1 |

FOREIGN PATENT DOCUMENTS

| | | |
|---|---|---|
| 0 304 050 A1 | 2/1989 | European Pat. Off. . |
| 56-46221 | 4/1981 | Japan . |
| 57-11090 | 1/1982 | Japan . |

(List continued on next page.)

OTHER PUBLICATIONS

Taiyo Yuden Co., Ltd., "Nikkei Electronics", vol. No. 445, Jan. 23, 1989, p. 107.

"Write Once Read Multiple (WORM) Optical Disk that Meets the CD Standards Ensures Recording Due to Thermal Deformation of the Critical Surface Between a Substrate and a Pigment Layer" Nikkei Electronics, vol. No. 445 (Jan. 23, 1989).

Olympus Optical Co Ltd, JP 62 201289 A, *Chemical Abstracts*, abstract nos. RN 113941–09–6, 113941–11–0, 113941–13–2, 113941–14–3, vol. 108, No. 20, May 16, 1988.

(List continued on next page.)

*Primary Examiner*—Elizabeth Evans
*Attorney, Agent, or Firm*—Venable; Robert J. Frank; Ashley J. Wells

[57] ABSTRACT

An optical recording medium including a substrate which transmits light, which has a main surface, and which has a groove defined in the main surface; a recording layer formed on the main surface; and a metal reflection layer formed on the recording layer, wherein the recording layer is a thin film comprised of organic dye, contains at least one cyanine dye represented by general formula (I) as a main constituent, and is capable of corresponding to short-wavelength laser beam:

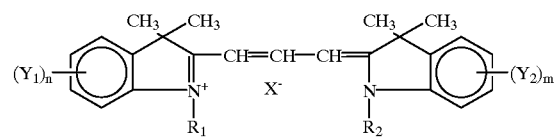

(I)

where X- represents an iodide ion, a bromide ion, a perchlorate ion, a borofluoride ion, a tetrafluorophosphate ion, a tetrafluoroantimonate ion, a methylsulfate ion or a methylbenzenesulfonate ion; one of $R_1$ or $R_2$ represents a $C_{3-18}$ substituent having an unsaturated bond, and another one of $R_1$ and $R_2$ represents a $C_{3-18}$ substituent having one of an unsaturated bond, an alkyl group, an aryl group or an alkoxy group; $Y_1$ and $Y_2$ respectively represent a hydrogen atom, an alkyl group, an aryl group, an alkoxy group, a halogen atom, a nitro group, a hydroxyl group, a carboxyl group, a —$OCF_3$ group, a hydroxyalkyl group, a cyanovinyl group, an alkylcarbonyl, a carboxyalkyl group, an alkylcarbonyl, or a residue which is condensed with a benzene ring to form an optionally substituted naphthalene ring; n and m respectively represent an integer ranging from 1 to 4; and $(Y_1)n$ and $(Y_2)m$ respectively represent structures which are asymmetric each to one other in the cyanine dye module.

12 Claims, 2 Drawing Sheets

FOREIGN PATENT DOCUMENTS

| | | |
|---|---|---|
| 57-66541 | 4/1982 | Japan . |
| 57-82094 | 5/1982 | Japan . |
| 57-82095 | 5/1982 | Japan . |
| 59-24692 | 2/1984 | Japan . |
| 59-124894 | 7/1984 | Japan . |
| 59-203247 | 11/1984 | Japan . |
| 60-44389 | 3/1985 | Japan . |
| 60-71296 | 4/1985 | Japan . |
| 61-290092 | 12/1986 | Japan . |
| 62-432 | 1/1987 | Japan . |
| 62-201288 | 9/1987 | Japan . |
| 62-201289 | 9/1987 | Japan . |
| 63-1594 | 1/1988 | Japan . |
| 63-168201 | 7/1988 | Japan . |
| 63-218398 | 9/1988 | Japan . |
| 1-40389 | 2/1989 | Japan . |
| 1-178494 | 7/1989 | Japan . |
| 2-87341 | 3/1990 | Japan . |
| 5-38879 | 2/1993 | Japan . |
| 5-67352 | 3/1993 | Japan . |
| 5-139047 | 6/1993 | Japan . |
| 6-40162 | 2/1994 | Japan . |
| 6-199045 | 7/1994 | Japan . |
| 6-320869 | 11/1994 | Japan . |
| 6-338059 | 12/1994 | Japan . |
| 7-4981 | 1/1995 | Japan . |
| 7-44904 | 2/1995 | Japan . |
| 7-52544 | 2/1995 | Japan . |
| 7-156550 | 6/1995 | Japan . |
| 7-161069 | 6/1995 | Japan . |
| 7-186530 | 7/1995 | Japan . |
| 7-251567 | 10/1995 | Japan . |
| 7-262611 | 10/1995 | Japan . |
| 8-99467 | 4/1996 | Japan . |
| 8-306074 | 11/1996 | Japan . |

OTHER PUBLICATIONS

Mitsubishi Rayon Co Ltd, JP 03 045384 A, *Chemical Abstracts*, abstract nos. RN 113941–11–0, 132036–03–4, 105832–22–2, vol. 115, No. 26, Dec. 30, 1991.

Ricoh KK, JP 08 282107 A, Chemical Abstracts, abstract No. RN 185319–92–0.

OPTICAL RECORDING MEDIUM

This application is based on applications No. 39,472/1997 filed Feb. 24, 1997, and No. 91,982/1997 filed Apr. 10, 1997 in Japan, the content of which are incorporated hereinto by reference.

BACKGROUND OF THE INVENTION

1. Field of the Invention

The present invention relates to an optical recording medium, which is capable of performing high-density recording and readout using short-wavelength laser beam. More particularly, it relates to a write-once type optical recording medium having excellent sensitivity and reliability according to DVD standard, which is capable of high-density recording and readout information by decreasing spot light using an organic dye thin film whose light reflectance changes with short-wavelength laser beam.

2. Description of the Related Art

Optical recording mediums capable of recording have come into wide use. The optical recording medium has a feature that the recording medium does not cause wear deterioration because a writing (recording) or reading (readout) head is of a non-contact type. Furthermore, the optical recording medium has attracted much attention and has been developed as a large-capacity information carrier because the writing density can be extremely increased by decreasing a spot size of optical beam.

The recording and readout of the optical recording medium are performed as follows. For example, the recording can be performed by condensing laser beam in a recording layer, converting said laser beam into heat energy and changing the properties of the recording film by melting, decomposition, removing, etc. to form a deformed layer pit, whereas the readout can be performed by a change in amount of reflected light as compared with the unrecorded portion. As the recording layer, a film of a chalcogenide metal represented by a tellurium alloy was put into practice at first. However, the chalcogenide metal film is disadvantageous in that it is harmful to humans, it formation involves a dry method and it is difficult therewith to meet increasing demand for higher density recording. Therefore, studies were made on recording layers comprising materials which could be used in place of the inorganic metal films including tellurium alloy films in order to obtain a recording medium having a dye film layer so that uniform pit diameters could be obtained for achieving higher density recording, higher sensitivity and dependence of laser beam on wavelength could be obtained, higher reliability could be obtained, and production costs could be reduced considerably. Therefore, proposals and reports about a medium using a recording layer containing an organic dye as a main component have been increased. The reason is as follows: (1) a recording layer can be made by forming a thin film using a wet method represented by a spin-coating method, although the reflectance is lower than that of the metal; (2) it is not corroded because of excellent oxidation resistance; (3) local heating can be performed without exerting a heat influence on the peripheral portion in comparison with the metal recording layer because of low heat conductivity; and (4) it has a lot of excellent properties; e.g. high sensitization can be realized.

From the structural point of view, a so-called air sandwiched structure obtained by providing an air layer on a recording layer of a generally used dye film and an optical recording medium capable of obtaining a readout signal corresponding to the CD standards are suggested. These structures are described in Japanese Patent Application Publication No. 3-759343, Japanese Patent Application Laid-open No. 2-87341, Japanese Patent Application Laid-open No. 5-67352 and Nikkei Electronics No. 469, page 107, Jan. 23, 1989.

In the optical recording disc in accordance with the CD standards, for example, there are known those discs obtained by forming a light absorption layer of an organic dye on a light transmitting resin substrate, forming a light reflection layer represented by Au directly or via a hard layer thereon and forming a resin protective layer on this light reflection layer. The light reflection layer is formed because high reflectance of 65% or more can not be obtained by using only the organic dye film.

In case that laser beam is irradiated to this disc, the organic dye layer absorbs light so that it is molten or decomposed and, at the same time, the substrate is softened and the dye is mixed with the substrate at the interface. Finally, a recorded pit whose interface is deformed is formed. In the deformed layer pit thus formed, the light reflectance varies with the light phase difference and reading can be performed similarly to CD.

As the organic dye layer of this optical disc, there are known, for example, squarilium dyes (Japanese Patent Application Laid-open Nos. 56-46221, 63-218398, 1-178494, 5-139047 and 7-44904), naphthoquinone dyes (Japanese Patent Application Laid-open Nos. 61-290092, 62-432, 63-168201 and 1-139047), azo dyes (Japanese Patent Application Laid-open Nos. 7-161069, 7-251567 and 8-99467), phthalocyanine dyes (Japanese Patent Application Laid-open Nos. 57-82094, 57-82095, 7-156550, 7-16068 and 7-52544) and cyanine dyes represented by the following general formula (III) (Japanese Patent Application Laid-open Nos. 59-24692, 6-199045, 7-262611, 6-338059, 6-320869, 2-87341, 62-201288 and Japanese Patent Application Publication 7-4981).

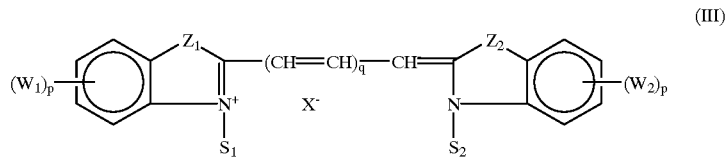

(III)

wherein $S_1$ and $S_2$ independently represent an alkyl group, an aryl group or an alkoxyl group; $W_1$ and $W_2$ independently represent a halogen atom, a hydrogen atom, an alkyl group, an alkoxyl group, an aryl group, an alkoxysulfonyl group, a sulfonylalkyl group or a cyano group; and $Z_1$ and $Z_2$ independently represent a sulfur atom, an oxygen atom, a selenium atom or ethylene.

Among the above dyes, cyanine dyes represented by the general formula (III) above are mainly used in view of the sensitivity, C/N ratio, ease of converting into a thin film, etc. These cyanine dyes are generally dyes having absorption and reflectance at a semiconductor laser wavelength of about 780 to 830 nm, wherein the number of methylene chains in the center of the molecular structure is generally 2 (i.e., q is 2 in the general formula (III)) so as to be in accordance with the CD standards. However, the cyanine dyes having two methylene chains have a fatal problem that they cannot correspond to short-wavelength laser. Furthermore, it is considered that the cyanine dyes represented by the general formula (III) have problems about readout deterioration, long-term stability of the film, C/N ratio, jiter component, etc. Reasons for the above are (i) that heat accumulation arises in the recording layer by a long-term exposure to reading light and the dye itself is deteriorated and discolored, (ii) that the reading light is abosrbed at the interface of the recording layer where the deformed layer portion and non-recorded portion should be discriminated one from the other so that the melting or heat deformation arises slowly, and in addition distortion of the contour of the deformed layer pit arises simultaneously due to the similar heat accumulation, (iii) that when it is excited, the dye is oxidatively deteriorated (discolored) due to singlet oxygen which is generated due to transfer of energy from the dye to oxygen in the atmosphere, (iv) that as the phenomenon of deterioration after a long-term storage, there occur variation in the transmittance of a cyanine dye due to natural light and oxidation of the dye as well as association or agglomeration of the dye molecules due to oxygen or moisture, and the like. To solve these problems, various proposals have hitherto been made (cf., e.g., Japanese Patent Application Laid-open Nos. 62-201288, 62-201289, 57-66541, 59-124894, 59-203247, 62-133173, 63-198096, 59-21339, 57-11090, 60-44389, 60-71296, 63-1594, 57-11090, 5-38879, 7-262611, and 7-4981). However, these problems are still to be sufficiently solved.

On the other hand, there has been made development of an optical disc having high recording density in accordance with DVD standards as a high density optical memory. There have been proposed a system in which use is made of a semiconductor laser with a wavelength of about 600 to 680 nm, that is shorter than the wavelength used for currently prevailing Cds in view of the fact that the spot diameter is represented by the formula of [wavelength (λ)/numerical aperture (NA) of an objective lens], a system in which the wavelength of light is shorten by utilizing a SHG (second harmonic generation) element and a beam spot diameter is decreased to a laser diffraction limit using an objective lens, thereby enhancing the recording density, and the like. Development of recorging media corresponding to these systems is desired.

Furthermore, there have been made an improvement in cyanine dye represented by the general formula (III) corresponding to the CD standards and proposal of a cyanine dye for shorter wavelengths are made (Japanese Patent Application Laid-open Nos. 6-199045, 7-186530, 8-306074, 5-38879, 6-40162, etc.).

However, various problems are still to be solved. For example, the recording layer does not have a sensitivity which corresponds to the desired wavelength. Further, the recording layer does not have a sufficient film stability since the number of methylene chain is one (q=1) in the cynine dye represented by the general formula (III) corresponding to the CD standards so that uniform stable amorphous film cannot be obtaned, or a reliability due to agglomeration or the like undesirable phenomena. Furthermore, the amount of the jiter component contained in a readout signal increases by heat interference between adjacent pits when higher density recording is attempted.

SUMMARY OF THE INVENTION

Under these circumstances, the present invention has been accomplished, and an object of the present invention is to provide an optical recording medium in accordance with the DVD standards, which has high recording density and low jiter component and is also superior in long-term reliability, by finding a recording medium containing a dye which has high sensitivity to short-wavelength laser beam having a wavelength of 500 to 700 m and good chemical/photochemical/physical/thermal stability.

The present inventors have intensively studied about various dyes in order to solve the above problems. As a result, the present inventors have found that the cyanine dyes must meet the requirements that the number of methylene chains for bonding two indole nuclei of the cyanine dye is one (1) and the substituent bonded to the nitrogen atom of the indole nucleus contains an unsaturated group and, furthermore, the molecular symmetry of the substituent or residue bonded to two benzene rings of the indole nucleus exerts an influence on the above characteristics. Thus, the present invention has been accomplished based on the above-described discoveries.

According to the present invention, there is provided an optical recording medium comprising:
  a substrate which transmits light and has a groove on a main surface;
  a recording layer formed the main surface of the substrate having the groove; and
  a metal reflection layer formed on the recording layer, the recording layer being formed on the main surface of the substrate having the groove;
  wherein the recording layer is an organic dye thin film which contains at least one cyanine dye represented by the following general formula (I) as a main component and is capable of corresponding to short-wavelength laser beam.

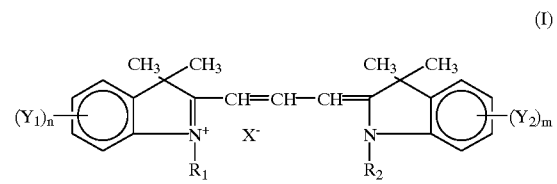

(I)

wherein X- represents an iodide ion, a bromide ion, a perchlorate ion, a borofluoride ion, a tetrafluorophosphate ion, a tetrafluoroantimonate ion, a methylsulfate ion or a methylbenzenesulfonate ion;
one of $R_1$ and $R_2$ represents a $C_{3-18}$ substituent having an unsaturated bond, and the other one represents a $C_{3-18}$ substituent having an unsaturated bond, an alkyl group, an aryl group or an alkoxy group;
$Y_1$ and $Y_2$ independently represent a hydrogen atom, an alkyl group, an aryl group, an alkoxy group, a halogen atom, a nitro group, a hydroxyl group, a carboxyl group, a —OCF3 group, a hydroxyalkyl group, a cyanovinyl group, an alkoxycarbonyl group, a carboxyalkyl group, an alkylcarbonyl, or a residue which is condensed with a benzene ring to form an optionally substituted naphthalene ring;
n and m independently represent an integer of 1 to 4; and $(Y_1)_n$ and $(Y_2)_m$ independently represent structures which are asymmetric each other in the cyanine dye molecule.

Here, the one of $R_1$ and $R_2$ may be a $C_{3-18}$ substituent having an unsaturated bond, and other one may be an alkyl group, an aryl group or an alkoxy group.

The both $R_1$ and $R_2$ may represent a $C_{3-18}$ substituent having an unsaturated bond.

The $C_{3-18}$ substituent having an unsaturated bond represented by $R_1$ and $R_2$ may have a vinyl group or a phenylvinyl group at the end.

The one of $R_1$ and $R_2$ may be a $C_{3-18}$ substituent having an unsaturated bond, and the other one may be a $C_{3-18}$ substituent having an unsaturated bond, a $C_{1-18}$ alkyl group, a $C_6$ aryl group or a $C_{1-18}$ alkoxy group; and $Y_1$ and $Y_2$ independently may represent a hydrogen atom, a $C_{1-18}$ alkyl group, a $C_6$ aryl group, a $C_{1-18}$ alkoxy group, a halogen atom, a nitro group, a hydroxyl group, a carboxyl group, a —$OCF_3$ group, a —$R_3OH$ group, a —$R_3COOR_4$ group, a —CH=CHCN group, a —$COOR_4$ group, a —$R_3COOH$ group, a —$COR_3$ group ($R_3$ is a $C_{1-9}$ alkylene group, and $R_4$ is a $C_{1-9}$ alkylene group) or a residue which is condensed with a benzene ring to form an optionally substituted naphthalene ring.

The cyanine dye represented by the general formula (I) may be a combined system of two or more kinds of them.

The an oxygen quencher may be contained in the recording layer in an amount of 1% or more.

The metal reflection layer may be a thin film of a single metal or alloy having high melting point and a light reflectance of 55% or more to short-wavelength laser beam, selected from the group consisting of Al, Au, Ag, Cu, Ni, Ti and chalcogenide metal.

The optical recording medium may be a single-sided optical recording medium obtained by laying a recording layer and a metal reflection layer in sequence on a substrate and further laying a protective layer thereon.

The optical recording medium may be obtained by laminating a single-sided substrate and a non-grooved substrate each other via an adhesive, the one-sided substrate being prepared by laying a recording layer and a metal reflection layer in sequence on a substrate, on which a groove is formed, and further laying a protective layer thereon.

The optical recording medium may be a double-sided optical recording medium obtained by laminating two single-sided optical recording mediums each other via a protective layer, the single-sided optical recording medium being prepared by laying a recording layer and a metal reflection layer in sequence on a substrate and further laying a protective layer thereon.

The optical recording medium may be a double-sided optical recording medium obtained by forming a groove on both surfaces of a substrate as a base upon molding, laying a recording layer and a metal reflection layer in sequence on the both surfaces of the substrate and further laying a protective layer thereon.

According to the present invention, since the cyanine dye represented by the general formula (I) is used in the recording layer of the optical recording medium, there can be obtained an optical recording medium in accordance with the DVD standards, which has sufficient sensitivity and light reflectance to short-wavelength laser beam and forms a uniform, amorphous recording film because of the short-wavelength (500 to 700 nm) correspondence and chemical, photochemical and thermal stabilities, which prevents heat interference and heat accumulation of pits when higher density recording is attempted and contains a small amount of the jiter component, which is capable of high-density recording, which causes little readout deterioration, and which has excellent long-term reliability.

In the above invention, since 1% or more of an oxygen quencher is contained in the recording layer, light deterioration of the cyanine dye due to ultraviolet ray, laser beam, etc. is prevented and the light stability of the cyanine dye increases, thereby obtaining an optical recording medium which is superior in long-term reliability.

Furthermore, since the optical recording medium using the cyanine dye represented by the general formula (I) in the recording layer according to the present invention is a thin film of a metal selected from the group consisting of Al, Au, Ag, Cu, Ni, Ti and chalcogenide metal in the metal reflection layer, the light reflectance to short-wavelength light is large and, therefore, a high-density optical recording medium can be obtained by using short-wavelength laser beam.

Since it is constructed in a single-sided, laminate-type or double-sided structure, the optical recording medium using the cyanine dye represented by the general formula (I) in the recording layer according to the present invention is easy to produce and suitable for mass production.

The above and other objects, effects, features and advantages of the present invention will become more apparent from the following description of embodiments thereof taken in conjunction with the accompanying drawings.

DESCRIPTION OF THE PREFERRED EMBODIMENTS

Figure 1:
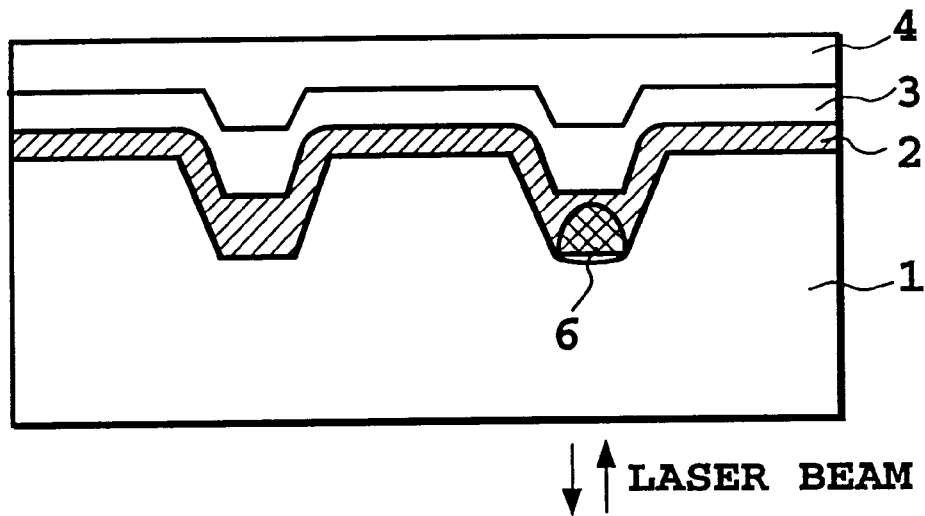
FIG. 1 is a schematic cross sectional view showing a single-sided optical recording medium as one embodiment of the present invention.

The present invention will be described in detail with reference to FIGS. 1 to 4. In FIGS. 1 to 4, reference numeral 1 denotes a substrate, 2 is a recording layer, 3 is a metal reflection layer, 4 is a protective layer, 5 is an adhesive layer, 6 is a deformed layer pit, and 7 is a non-grooved substrate, respectively.

Figure 2:
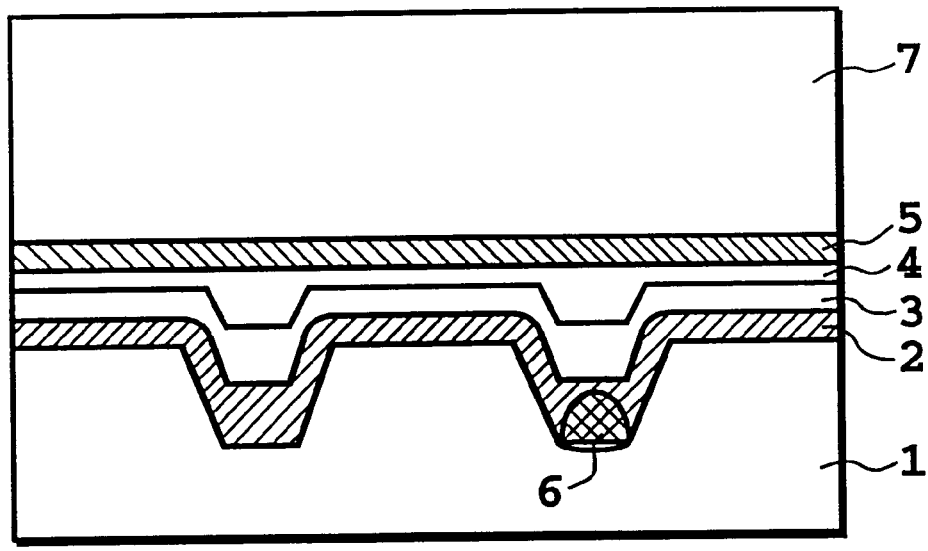
FIG. 2 is a schematic cross sectional view showing a single-sided optical recording medium as another embodiment of the present invention.
Figure 3:
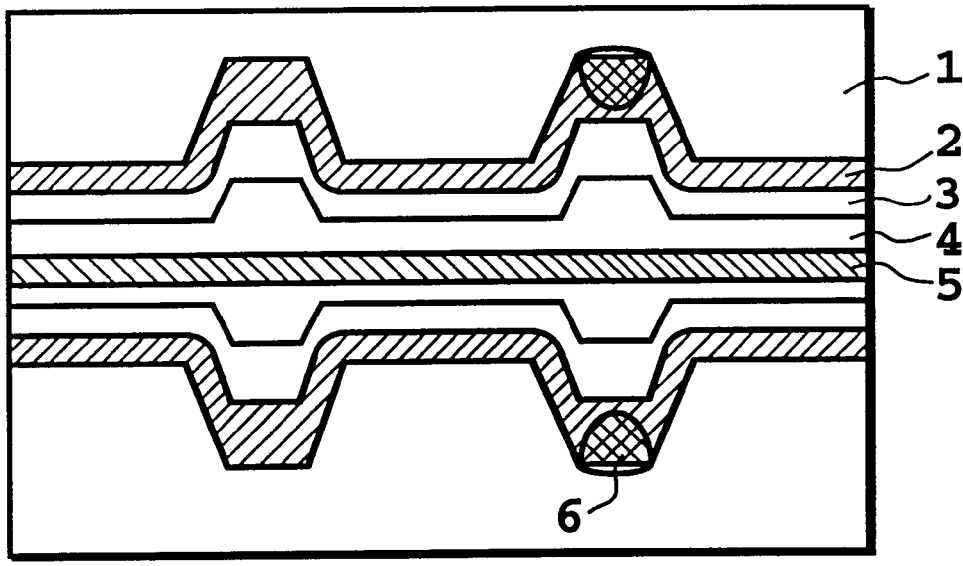
FIG. 3 is a schematic cross sectional view showing a laminate-type optical recording medium as another embodiment of the present invention.
Figure 4:
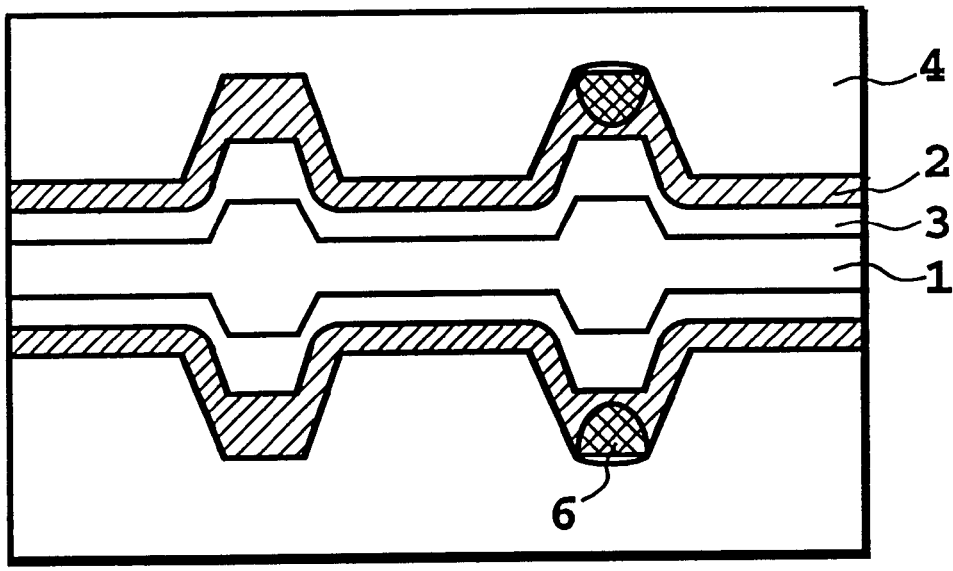
FIG. 4 is a schematic cross sectional view showing a double-sided optical recording medium as still another embodiment of the present invention.

The optical recording medium as shown in FIG. 1 is a single-sided optical recording medium, in which one main surface of a substrate 1 is provided with a prepit or pregroove for tracking, and the main surface including this pregroove is coated with a recording layer 2. A metal reflection layer 3 is provided on the recording layer 2 and a protective layer 4 is provided on the metal reflection layer 3. The protective layer 4 may be omitted. The prepit is converted into a deformed layer pit 6 by a writing operation. An optical recording medium as shown in FIG. 2 is that obtained by providing an adhesive layer 5 on the protective layer 4 shown in FIG. 1 and bonding a non-grooved substrate 7 thereto. An optical recording medium as shown in FIG. 3 is a laminate-type optical recording medium having a structure in which the protective layers of two optical recording mediums shown in FIG. 1 are bonded to each other via the adhesive layer 5. Referring to FIG. 4, a prepit or pregroove for tracking is formed on both main surfaces of a substrate and a metal reflection layer 3 is provided on each main surface and, furthermore, a recording layer 2 is formed thereon and a protective layer 4 is further provided thereon. In this case, a groove is formed so that the unevenness of the groove on the substrate is the inverse of that of the groove formed on the substrate of the optical recording medium shown in FIG. 1.

The substrate 1 has a disc-shape, and a prepit or pregroove for tracking is formed in a concentric or spiral form on one main surface (single-sided and laminate-type) or two main surfaces (double-sided of the substrate. In such a substrate having a prepit or pregroove, an injection-molded resin is used in view of the productivity and the resin used is preferably one which is substantially transparent (transmittance of laser beam is not less than 85%) to recording light and readout light (semiconductor laser beam of about 500 to 700 nm, particularly 600 to 680 nm). The thickness of the laminates in FIGS. 1 to 4 is from about 1.0 to 1.5 mm. In case of the laminate-type optical recording medium, those having a thickness of about 0.5 to 0.65 mm are laminated to each other. In case of the double-sided type, a prepit or pregroove is simultaneously molded on two main surfaces. The diameter is from about 54 to 120 mm and the resin constituting the substrate is not specifically limited, but thermoplastic resins such as polycarbonate resin, polyacrylic resin, polyester resin, amorphous olefin resin, TPX, Arton resin, etc. are used in view of the moldability and light transmission property. The track pitch is from 0.7 to 1.6 μm. The depth of the groove is utilized for tracking control, retention of information, etc. according to the phase of laser beam, but is from about 50 to 230 nm, preferably from about 70 to 200 nm. When the depth of the groove is too small, the deformation rate of the groove bottom surface and influence exerted on the metal reflection layer are liable to increase and distortion of a readout signal is liable to be induced, thereby causing an increase in jiter and a decrease in modulation factor. On the other hand, when the depth of the groove is too large, the deformation amount of the groove bottom surface of the recording mark portion becomes unstable and the jiter increases.

Therefore, the wavelength-dependence of the readout signal and tracking signal increases. Accordingly, the depth of the groove is important depending on the wavelength of semiconductor laser beam during the high-density recording, and it is necessary to optimize the depth and shape by the characteristics and film forming property of the recording film.

The cyanine dye represented by the above general formula (I) is contained in the recording layer 2. All of the cyanine dyes in the present invention have absorption and reflectance wavelengths at 500 to 700 nm and have sufficient sensitivity and reflectance to the laser wavelength (600 to 680 nm) after forming into a thin film.

$R_1$ and $R_2$ may be substituents having an unsaturated bond, simultaneously.

Particularly, examples of $R_1$ and $R_2$ include unsaturated bond-containing groups such as allyl, vinyl, allylidene, allyloxy, crotonoyl, styryl, vinylidene, vinylene, methylidyne, acryloxy, methacryloxy, isopropenyl, ethynyl, butenyl, etc., and are superior in film forming property and affinity with the surface of the substrate. The number of carbon atoms is from 3 to 18, and preferably from about 3 to 9. Use of substitutents having a number of carbon atoms greater than 18 tends to cause association of the molecules, generating noises. Further, the unsaturated groups represented by $R_1$ and $R_2$, respectively, may be the same or different When the substitutents contain more than 18 carbon atoms One of $R_1$ and $R_2$ may be the above substituent having an unsaturated bond, and the other one may be preferably a $C_{1-18}$ alkyl group, more preferably a $C_{1-9}$ alkyl group (e.g. methyl, ethyl, propyl, isopropyl, butyl, pentyl, hexyl, heptyl, octyl, nonyl, decyl, undecyl, dodecyl, tridecyl, etc.) or a $C_6$ aryl group (e.g. phenyl, etc.), or a C1–18 alkoxy group most preferably a $C_{1-9}$ alkoxy group (e.g. methoxy, ethoxy, propoxy, butoxy, pentoxy, hexoxy, octoxy, etc.).

As described above, the methylene chain needs to be shorter in order to correspond to the use of shorter wavelength laser beam. However, this causes agglomeration of the molecules particularly whenthe substituents $Y_1$ and $Y_2$ are arranged symmetrically on the two indole nuclei. Accordingly, in the present invention, agglomeration or association phenomena of the dye can be inhibited by introducing the above $R_1$ and $R_2$ and asymmetrically introducing the substituent of $Y_1$ and $Y_2$ so that film stability and high density recording can be obtained. These effects allow to provide a recording layer having excellent film forming property and reliability.

The cyanine dye represented by the general formula (I) can be synthesized with reference to known synthesis methods (e.g. U.S. Pat. Nos. 2,734,900, 2,112,139, 2,887,479, 3,410,848, 2,112,140, etc.). These patents are incorporated herein by reference.

Specific examples of the cyanine dye represented by the general formula (I) include the followings.

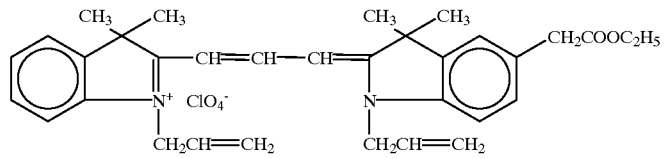

(I-1)

(I-2)
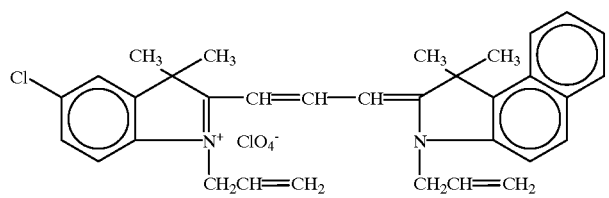
(I-3)
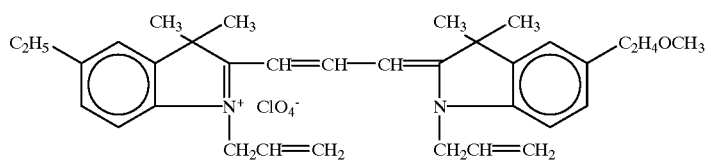
(I-4)
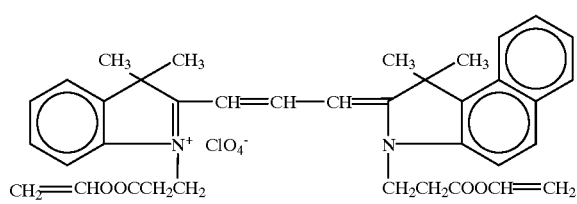
(I-5)
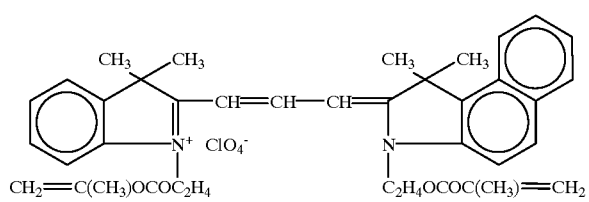
(I-6)
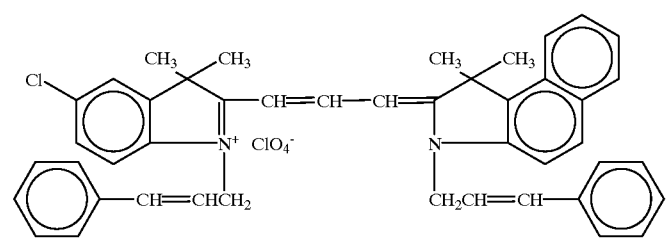
(I-7)
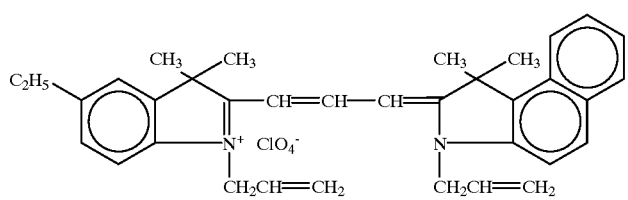
(I-8)
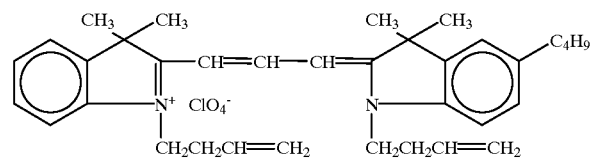

-continued
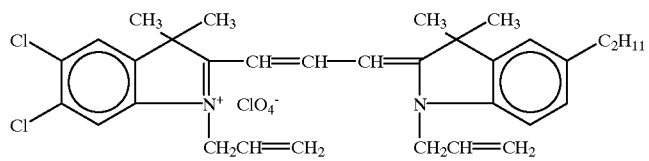
(I-9)
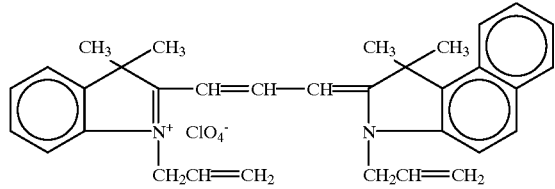
(I-10)
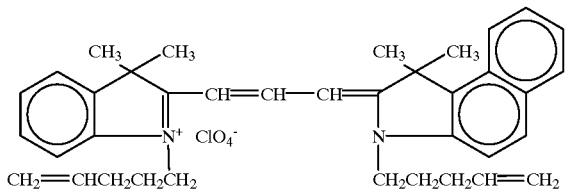
(I-11)
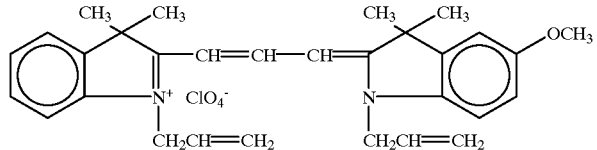
(I-12)
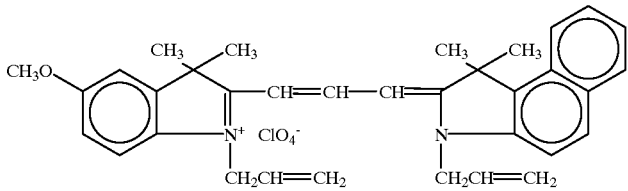
(I-13)
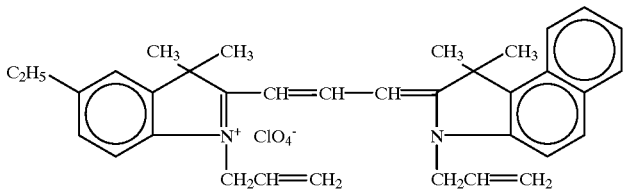
(I-14)
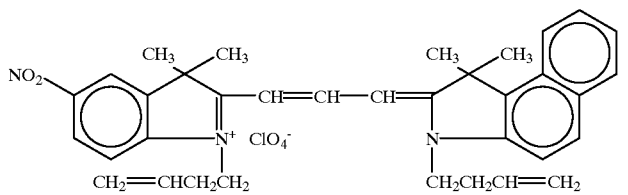
(I-15)
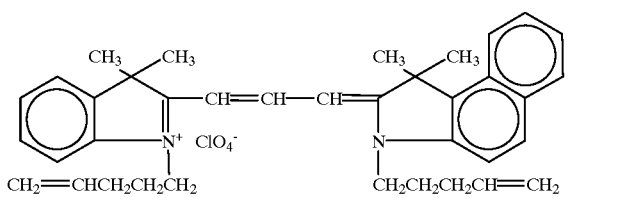
(I-16)

-continued
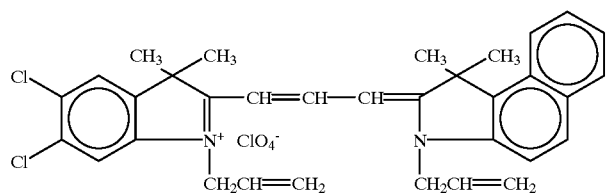
(I-17)
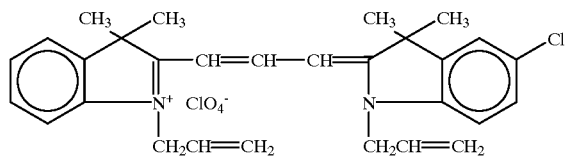
(I-18)
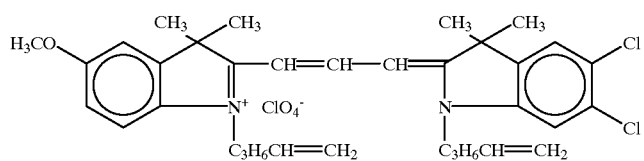
(I-19)
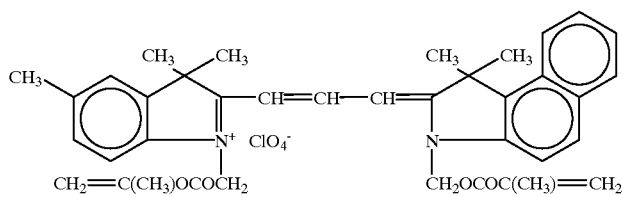
(I-20)
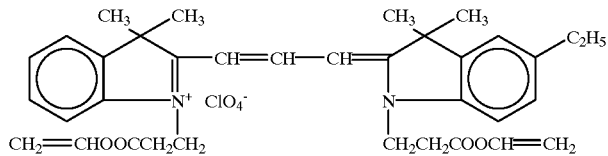
(I-21)
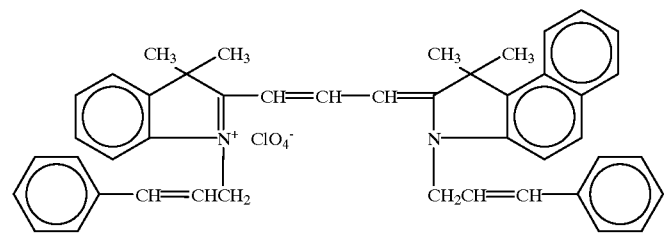
(I-22)
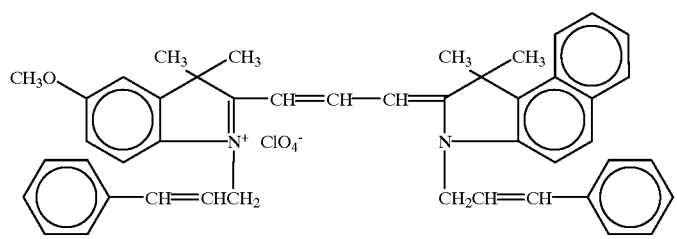
(I-23)

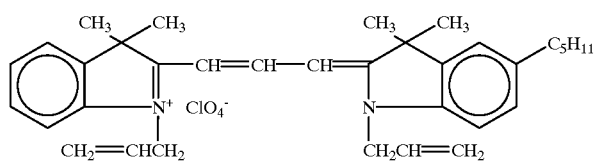
(I-24)
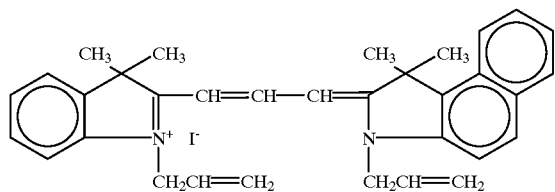
(I-25)
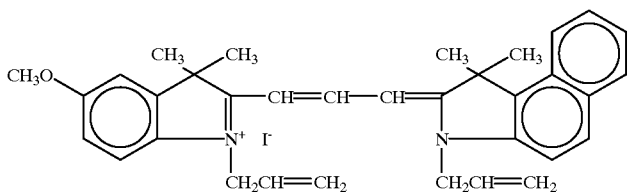
(I-26)
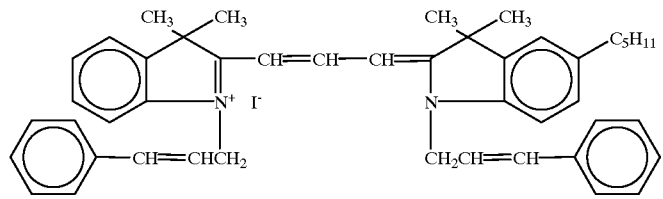
(I-27)
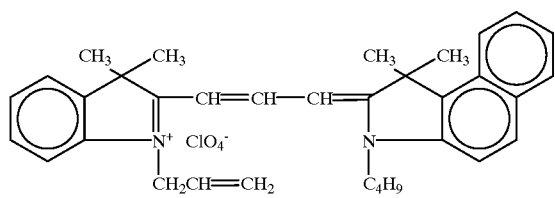
(I-28)
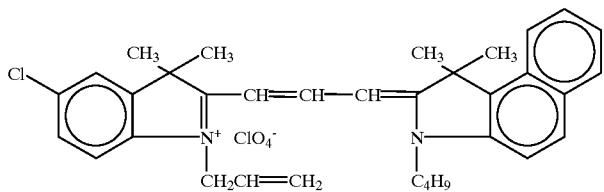
(I-29)
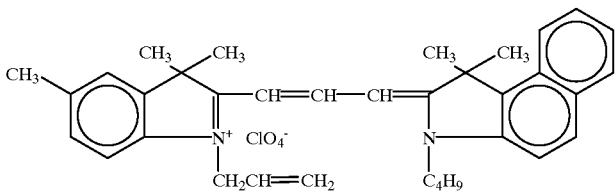
(I-30)

-continued
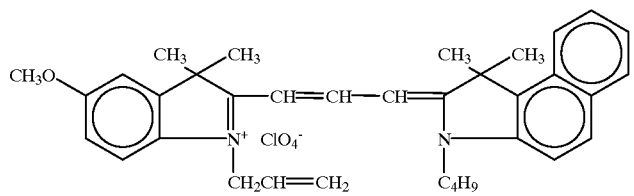
(I-31)
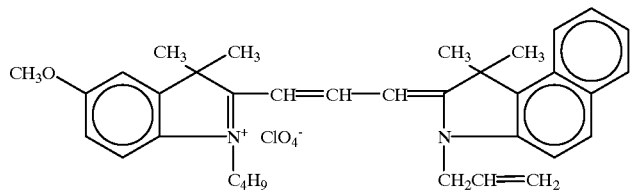
(I-32)
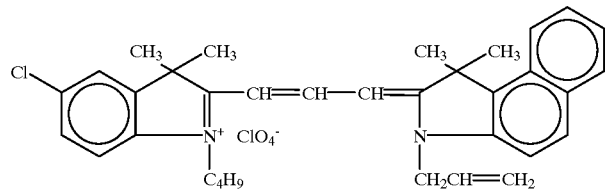
(I-33)
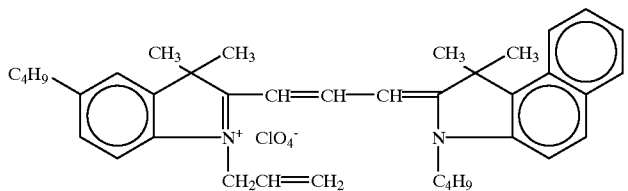
(I-34)
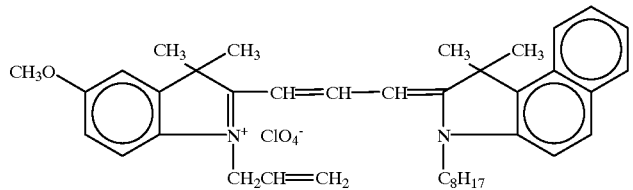
(I-35)
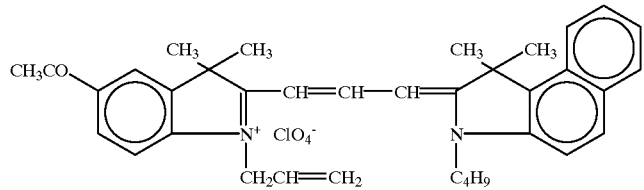
(I-36)
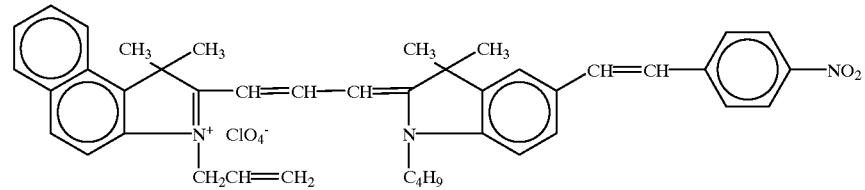
(I-37)

-continued
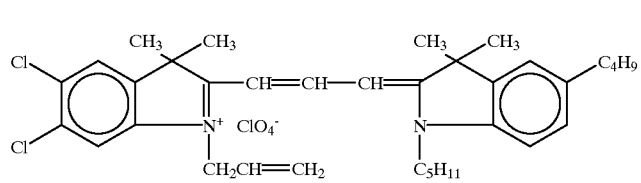
(I-38)
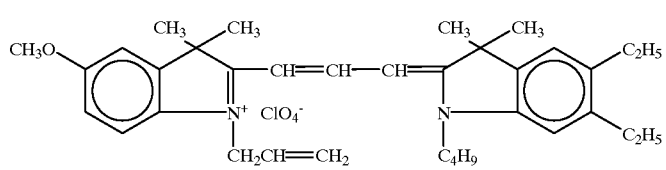
(I-39)
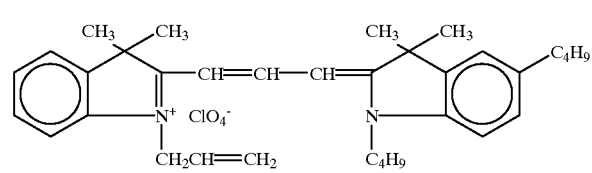
(I-40)
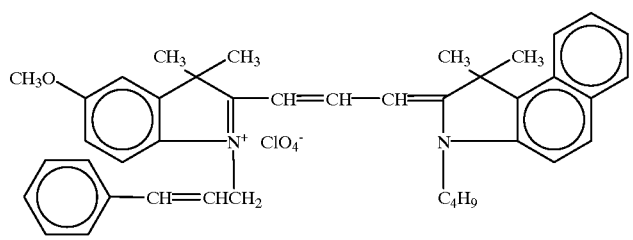
(I-41)
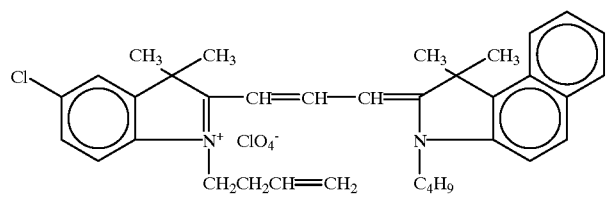
(I-42)
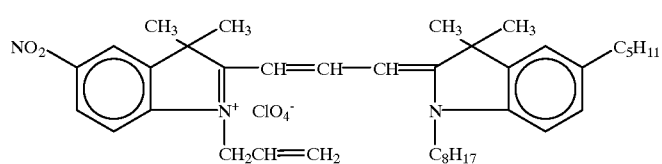
(I-43)
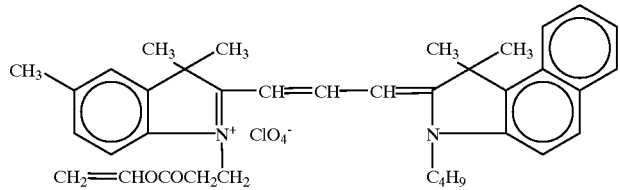
(I-44)
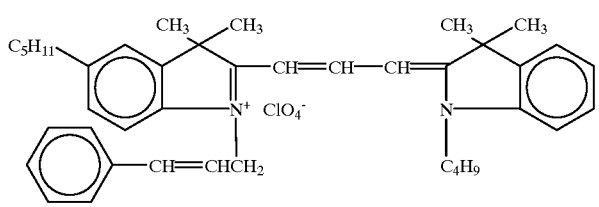
(I-45)

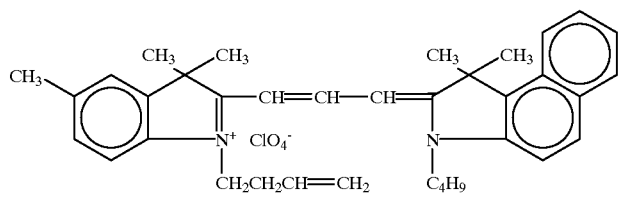
(I-46)
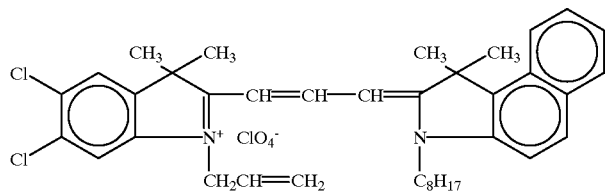
(I-47)
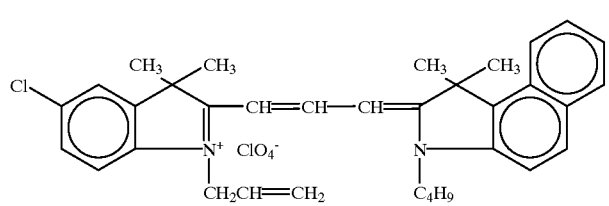
(I-48)
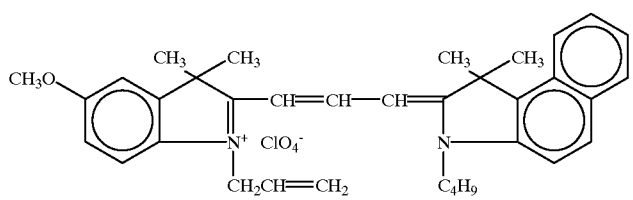
(I-49)
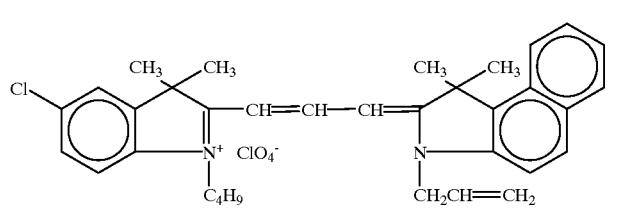
(I-50)
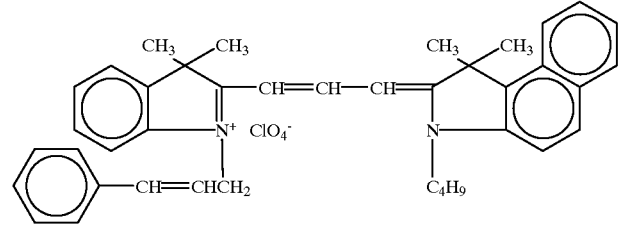
(I-51)
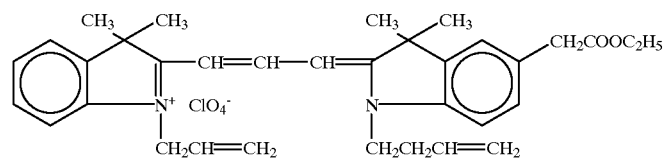
(I-52)

-continued
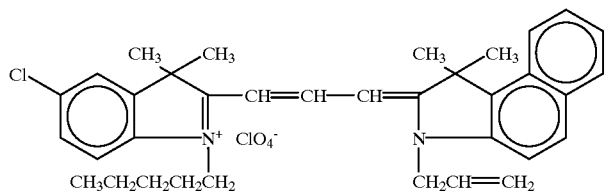
(I-53)
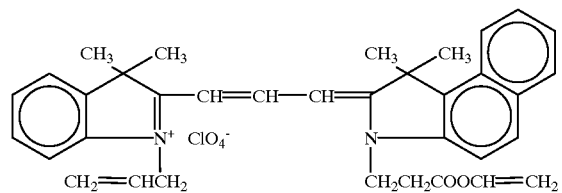
(I-54)
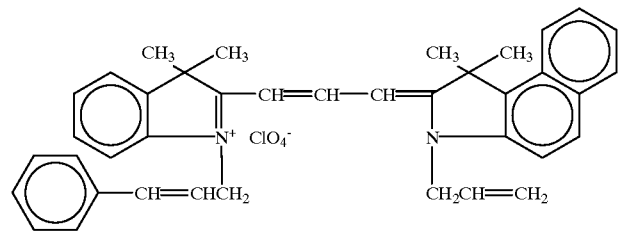
(I-55)
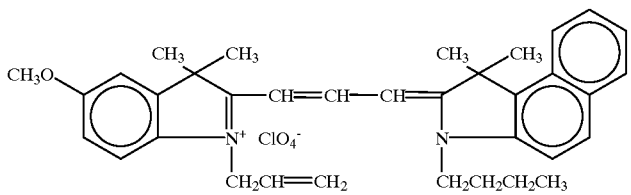
(I-56)
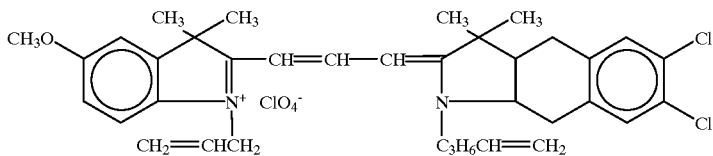
(I-57)
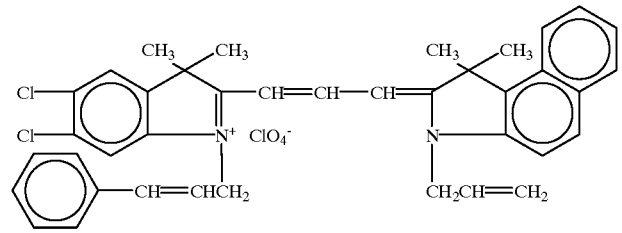
(I-58)
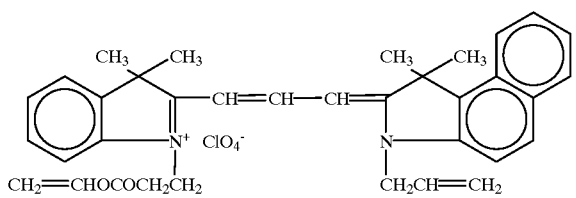
(I-59)

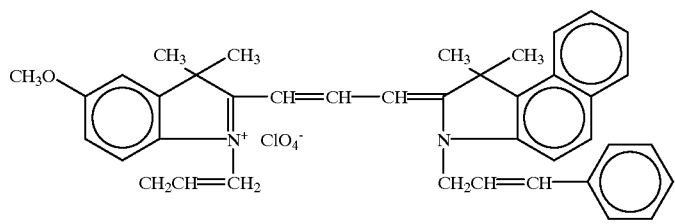
(I-60)
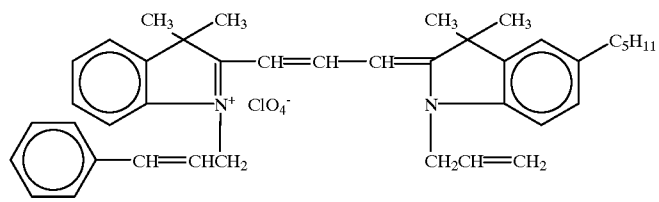
(I-61)
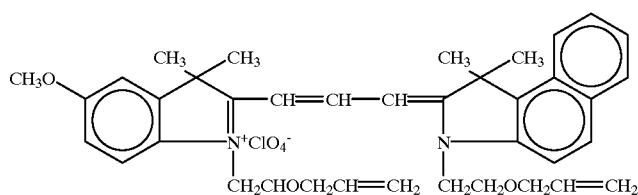
(I-62)
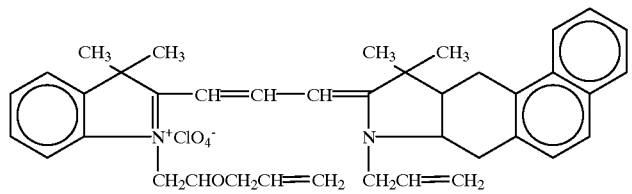
(I-63)
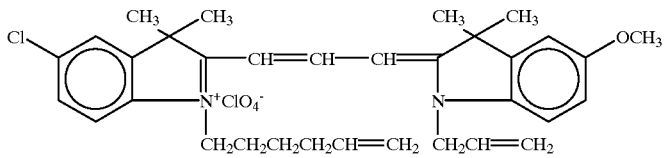
(I-64)
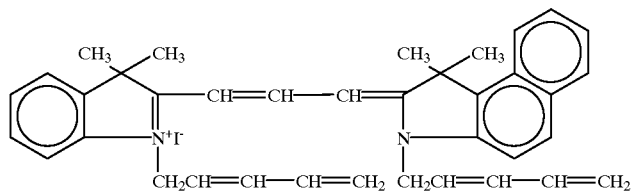
(I-65)
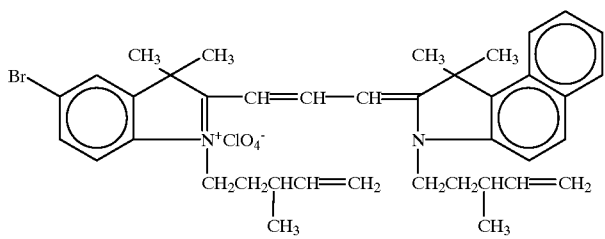
(I-66)

-continued

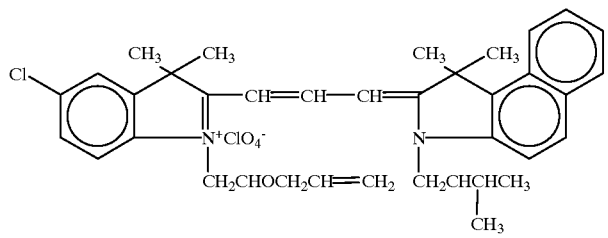
(I-67)

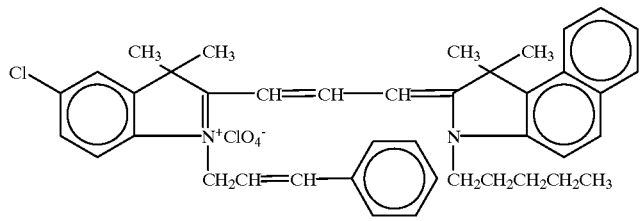
(I-68)

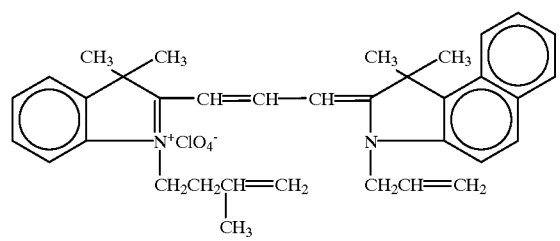
(I-69)

The above cyanine dyes in the present invention may be used alone, but the spectral characteristics (e.g. absorption of laser beam, light reflectance, etc.) can be controlled and the stability of the thin film in the amorphous state is improved by using two or more kinds of them in combination, which results in increase in sensitivity, reduction in jiter component and noise and improvement in long-term storage properties.

The recording layer 2 may contain an oxygen quencher (photostabilizer) in an amount of 1% or more, preferably 1 to 20% (more preferably 3 to 20%), together with the cyanine dye. This oxygen quencher scavenges a radical generated as a result of deterioration of the cyanine dye caused by ultraviolet ray, laser beam, etc., thereby terminating the chain reaction. It improves the photostability and prevents discoloration due to readout light, particularly. Thus, this recording layer can improve the long-period storage properties and inhibit flow of the film caused by heat generation. Specific examples of the oxygen quencher used, together with the above dye, include the followings.

[Metal complex]

Q1: bis(4-tetrabutyl-1,2-dithiophenolate)M-tetra-n-butylammonium
wherein M represents Cu, Co, Ni, Fe, etc. (BBT series, manufactured by Sumitomo Seika Co., Ltd.)

Q2: bis[4-(diethylamino)-α, β-stilbenedithiolate]nickel
(NKX-114, manufactured by Nippon Kanko Shikiso Kenkyusho Co., Ltd.)

Q3: bis[3-methoxy-4-(2-methoxyethoxy)-2'-chloro-α, β-stilbenedithiolate]nickel
(NKX-1199, manufactured by Nippon Kanko Shikiso Kenkyusho Co., Ltd.)

Q4: 1,2-benzenedithiol-nickel complex
(PA-1006, manufactured by Mitsui Toatsu Kagaku Co., Ltd.)

[Amine/ammonium salt]

Q5: bisiminium salt
(IRG-03, manufactured by Nippon Kayaku Co., Ltd.)

Q6: N,N,N',N"-tetrakis(p-dibutylaminophenyl)p-phenylenediamine
(NIR-AM1, manufactured by Teikoku Kagaku Co., Ltd.)

Q7: 4-nitroso-4'-(dimethylamino)diphenylamine
(NKX-1549, manufactured by Nippon Kanko Shikiso Kenkyusho Co., Ltd.)

These oxygen quenchers are not specifically limited, but may be added alone or in combination thereof.

The above cyanine dye is dissolved in a solvent for application, which does not attack the substrate (e.g. methylcellosolve, ethylcellosolve, methanol, ethanol, isopropanol, diacetone alcohol, dimethyl formamide, cyclohexanone, acetylacetone, tetrafluoropropanol, dichloroethane, dioxane, etc.) together with the oxygen quencher, and the resulting solution is generally applied on a substrate of the above resin, on which a groove is formed, by using a normal means such as spin coating, etc.

The thickness of the recording layer 2 is from about 50 to 500 nm, preferably from about 50 to 300 nm. When the thickness is smaller than 50 nm, the recording sensitivity and film stability are insufficient and an ideal recording cannot be performed. On the other hand, when this value exceeds 300 nm, it may become impossible to obtain a tracking signal and overlap of pits may arise. Therefore, jiter tends to increase and distortion of the waveform of the readout signal is liable to arise, thereby causing cross talk. It is advisable that the film thickness be controlled taking into consideration the film forming conditions, dye concentration and groove shape.

The metal reflection layer 3 is a thin film of a metal having a light reflectance of 55% or more, preferably 65% or more, to laser beam and having a melting point higher than that of the recording layer 2, selected from Al, Au, Ag, Cu, Ni, Ti and chalcogenide metal. The thin film has a film thickness of 30 to 150 nm, preferably about 50 to 100 nm. As a method of forming this thin film, there can be used a sputtering method, a vacuum deposition method, an ion plating method and the like.

The protective layer 4 is generally formed by applying an ultraviolet-curing resin using a spin coating method, a spray coating method, a gravure coating method, etc., and irradiating ultraviolet ray to cure the coated film. In addition, an epoxy resin, an acrylic resin and a silicone resin are also used and the protective layer has a sheet-like form. The double-sided protective layer 4 may be the above protective layer, or an inorganic film (e.g. SiOx, etc.) may be formed by a sputtering method or a deposition method. It may also be a polymer film obtained by polymerizing a resin such as Parylene, polyamide, polyimide, etc., using a method such as deposition, plasma, etc. The film thickness is from about 0.5 to 50 $\mu$m.

The laminate-type optical recording medium is obtained by laminating using an ultraviolet/visible-curing adhesive or an adhesive tape, and is used as a high-density optical recording medium which is capable of single-sided and double-sided recording/readout. The protective layer and adhesive layer ay be used in combination.

This optical recording medium has a constitution wherein a recording layer containing a cyanine dye having a specific structure as a main component is provided on a recording layer, and has sufficient sensitivity corresponding to short-wavelength laser beam (500 to 700 nm) and light reflectance. Furthermore, the optical recording medium causes no readout deterioration and has excellent long-term reliability, thereby accomplishing low-jiter high-density recording.

EXAMPLES

The following Examples further illustrate the present invention in detail but are not to be construed to limit the scope thereof.

Example 1

As a substrate was provided a polycarbonate substrate having a thickness of 6 mm and a track pitch (of a groove) of 0.75 $\mu$m.

A cyanine dye represented by the chemical formula (I-2) as a laser absorbing dye and a mixture of the above-described Q3 and Q6 (mixing ratio: 2:1) as an oxygen quencher (7% by weight based on the laser absorbing dye) were sufficiently dissolved in an ethylcellosolve/ethanol/diacetone alcohol mixed solvent (mixing in a mixing ratio of 5:3:2) in a concentration of 3% by weight, using an ultrasonic wave. After filtering with a filter, the resulting solution was applied on the above substrate by using a spin coating method to obtain a uniform recording layer 2 having a thickness of 80 nm. Subsequently, an Al film having a thickness of 70 nm was formed by a sputtering method to obtain a metal reflection layer 3. Furthermore, polyfunctional epoxy acrylate ultraviolet-curing paint was applied by a spin coating method and then cured to obtain a protective layer 4. The film was about 6 $\mu$m thick.

To obtain a laminate-type optical recording medium, the respective opposed protective layers of two single-sided optical recording mediums were laminated each other by low-temperature heat bonding to prepare a desired optical recording medium.

Example 2

An optical recording medium was prepared in the same manner as in Example 1, except that a cyanine dye represented by the chemical formula (I-2) and a cyanine dye represented by the chemical formula (I-3) were mixed in a weight ratio of 2:1.

Example 3

An optical recording medium was prepared in the same manner as in Example 1, except that a cyanine dye represented by the chemical formula (I-2) and a cyanine dye represented by the chemical formula (I-9) were mixed in a weight ratio of 2:1 and $Q_1$ and $Q_7$ are used in combination in a weight ratio of 2:1.

Example 4

An optical recording medium was prepared in the same manner as in Example 1, except that a cyanine dye represented by the chemical formula (I-13) and a cyanine dye represented by the chemical formula (I-24) were mixed in a weight ratio of 1:1.

Example 5

A mixture of a cyanine dye represented by the chemical formula (I-2) and a cyanine dye represented by the chemical formula (I-62) in a weight ratio of 2:1 and a mixture of oxygen quenchers $Q_1$ and $Q_6$ in a weight ratio of 1:1 (10 wt. % based on the weight of the laser absorbing dye system) were dissolved in tetrafluoropropanol with sonication to a concentration of 2 wt. %. After it was filtered with a filter, the solution thus obtained was spin-coated on the same substrate as used in Example 1 to a thickness of 80 nm to form a recording layer 2. Subsequently, an Al—Ti film having a thickness of 70 nm was formed by a sputtering method to obtain a metal reflection layer 3. Furthermore, polyfunctional epoxy acrylate ultraviolet-curing paint was applied by a spin coating method and then cured to obtain a protective layer 4. Thus an optical recording medium of 1.2 mm thick was obtained.

Example 6

An optical recording medium was prepared in the same manner as in Example 5, except that a cyanine dye represented by the chemical formula (I-12) and a cyanine dye represented by the chemical formula (I-63) mixed in a weight ratio of 1:1 were used.

Example 7

An optical recording medium was prepared in the same manner as in Example 1, except that a cyanine dye represented by the chemical formula (I-29) was used.

Example 8

An optical recording medium was prepared in the same manner as in Example 7, except that a cyanine dye represented by the chemical formula (I-29) and a cyanine dye represented by the chemical formula (I-40) were mixed in a weight ratio of 2:1.

Example 9

An optical recording medium was prepared in the same manner as in Example 7, except that a cyanine dye represented by the chemical formula (I-29) and a cyanine dye represented by the chemical formula (I-36) were mixed in a weight ratio of 2:1 and $Q_1$ and Q7 were used in combination in a weight ratio of 2:1.

Example 10

An optical recording medium was prepared in the same manner as in Example 7, except that a cyanine dye represented by the chemical formula (I-40) and a cyanine dye represented by the chemical formula (I-51) were mixed in a weight ratio of 1:1.

Example 11

An optical recording medium was prepared in the same manner as in Example 5, except that a cyanine dye represented by the chemical formula (I-28) and a cyanine dye represented by the chemical formula (I-67) were mixed in a weight ratio of 1:1 and oxygen quenchers $Q_1$ and $Q_6$ in a weight ratio of 1:1 were used.

Example 12

An optical recording medium was prepared in the same manner as in Example 10, except that a metal reflection layer 3 was formed by sputtering Au to a thickness of 80 nm onto the same recording layer 2 as in Example 10.

Example 13

An optical recording medium was prepared in the same manner as in Example 5, except that cyanine dyes represented by the chemical formulas (I-69), (I-62) and (I-29) were mixed in a weight ratio of 1:1 and oxygen quencheres $Q_1$ and $Q_6$ in a weight ratio of 1:1 were used.

Comparative Example 1

An optical recording medium was prepared in the same manner as in Example 1, except that a cyanine dye represented by the chemical formula (II-1) was used as the laser absorbing dye.

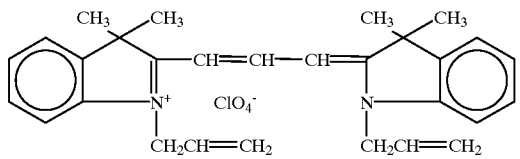

(II-1)

Comparative Example 2

An optical recording medium was prepared in the same manner as in Example 1, except that a cyanine dye represented by the chemical formula (II-2) (NK4288, manufactured by Nippon Kanko Shikiso Kenkyusho Co., Ltd.) was used as the laser absorbing dye.

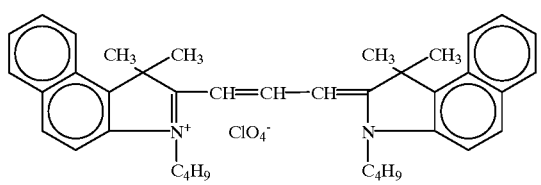

(II-2)

Comparative Example 3

An optical recording medium was prepared in the same manner as in Example 1, except that a cyanine dye represented by the above chemical formula (II-2) and a cyanine dye represented by the chemical formula (II-3) (NK4400, manufactured by Nippon Kanko Shikiso Kenkyusho Co., Ltd.) were used in combination in a weight ratio of 2:1 as the laser absorbing dye

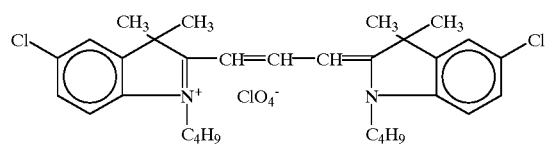

(II-3)

The light reflectance and readout signal characteristics (C/N ratio, jiter, error rate) of the resulting optical recording medium were measured. The readout signal characteristics were evaluated by using an evaluation device after light condensation was performed at a numerical aperture (NA) (of objective lens) of 0.60 using semiconductor laser beam having a linear rate (of a disc) of 3.3 m/second and a wavelength of 635 nm and recording was performed by recording Pw. The initial characteristics test, readout deterioration characteristics test (after $1 \times 10^4$ times) and high-temperature/high-humidity (70° C. or 80° C., 80% relative humidity, 24 hours) accelerated weathering test were performed.

The initial characteristics of the optical recording medium of Comparative Example 1 could not be evaluated because it showed no sensitivity to semiconductor laser beam. With respect to the initial characteristics of the other optical recording mediums, the light reflectance was larger than 55%, the S/N ratio was larger than 52 dB and the error rate was smaller than $1 \times 10^{-5}$. The optical recording mediums of Examples 1 to 4 showed the jiter of about 12%, whereas all of the optical recording mediums of Comparative Examples 2 and 3 showed a value larger than 20%.

A change in characteristics after readout deterioration and that after high-temperature/high-humidity test are shown in Tables 1 to 4 below.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

TABLE 1

| | Change in Characteristics After Reproducing Deterioration (%) | | | |
|---|---|---|---|---|
| | Optical Reflectance | C/N Ratio | Jiter | Error Rate |
| Example 1 | Ca. 5 | Ca. 10 | Ca. 15 | Ca. 10 |
| Example 2 | Ca. 3 | Ca. 2 | Ca. 5 | Ca. 7 |
| Example 3 | Ca. 5 | Ca. 3 | Ca. 7 | Ca. 8 |
| Example 4 | Ca. 6 | Ca. 3 | Ca. 9 | Ca. 10 |
| Example 5 | Ca. 3 | Ca. 4 | Ca. 7 | Ca. 7 |
| Example 6 | Ca. 5 | Ca. 4 | Ca. 6 | Ca. 8 |
| Comparative Example 1 | Impossible of measurement | Impossible of measurement | Impossible of measurement | Impossible of measurement |
| Comparative Example 2 | Ca. 20 | Ca. 30 | >50 | Impossible of measurement |
| Comparative Example 3 | Ca. 15 | Ca. 20 | Ca. 30 | Ca. 30 |

TABLE 2

| | Change in Characteristics After High-Temperature (70° C.)/High-Humidity Test (%) | | | |
|---|---|---|---|---|
| | Optical Reflectance | C/N Ratio | Jiter | Error Rate |
| Example 1 | Ca. 7 | Ca. 8 | Ca. 20 | Ca. 20 |
| Example 2 | Ca. 2 | Ca. 3 | Ca. 6 | Ca. 5 |
| Example 3 | Ca. 3 | Ca. 4 | Ca. 8 | Ca. 7 |
| Example 4 | Ca. 5 | Ca. 6 | Ca. 12 | Ca. 15 |
| Example 5 | Ca. 3 | Ca. 2 | Ca. 6 | Ca. 7 |
| Example 6 | Ca. 5 | Ca. 6 | Ca. 9 | Ca. 7 |
| Comparative Example 1 | Impossible of measurement | Impossible of measurement | Impossible of measurement | Impossible of measurement |
| Comparative Example 2 | Ca. 50 | Ca. 45 | Impossible of measurement | Impossible of measurement |
| Comparative Example 3 | Ca. 20 | Ca. 15 | Ca. 30 | Ca. 25 |

TABLE 3

| | Change in Characteristics After Reproducing Deterioration (%) | | | |
|---|---|---|---|---|
| | Optical Reflectance | C/N Ratio | Jiter | Error Rate |
| Example 7 | Ca. 5 | Ca. 10 | Ca. 15 | Ca. 10 |
| Example 8 | Ca. 3 | Ca. 3 | Ca. 6 | Ca. 8 |
| Example 9 | Ca. 3 | Ca. 2 | Ca. 6 | Ca. 8 |
| Example 10 | Ca. 6 | Ca. 4 | Ca. 9 | Ca. 10 |
| Example 11 | Ca. 4 | Ca. 5 | Ca. 6 | Ca. 7 |
| Example 12 | Ca. 4 | Ca. 6 | Ca. 7 | Ca. 8 |
| Example 13 | Ca. 3 | Ca. 4 | Ca. 5 | Ca. 5 |
| Comparative Example 1 | Impossible of measurement | Impossible of measurement | Impossible of measurement | Impossible of measurement |
| Comparative Example 2 | Ca. 20 | Ca. 30 | >50 | Impossible of measurement |
| Comparative Example 3 | Ca. 15 | Ca. 20 | Ca. 30 | Ca. 30 |

TABLE 4

| | Change in Characteristics After High-Temperature (70° C.)/High-Humidity Test (%) | | | |
|---|---|---|---|---|
| | Optical Reflectance | C/N Ratio | Jiter | Error Rate |
| Example 7 | Ca. 7 | Ca. 8 | Ca. 17 | Ca. 19 |
| Example 8 | Ca. 2 | Ca. 4 | Ca. 9 | Ca. 7 |
| Example 9 | Ca. 3 | Ca. 3 | Ca. 6 | Ca. 7 |
| Example 10 | Ca. 6 | Ca. 6 | Ca. 10 | Ca. 14 |
| Example 11 | Ca. 4 | Ca. 5 | Ca. 7 | Ca. 7 |
| Example 12 | Ca. 4 | Ca. 4 | Ca. 6 | Ca. 5 |
| Example 13 | Ca. 3 | Ca. 3 | Ca. 5 | Ca. 6 |
| Comparative Example 1 | Impossible of measurement | Impossible of measurement | Impossible of measurement | Impossible of measurement |
| Comparative Example 2 | Ca. 50 | Ca. 45 | Impossible of measurement | Impossible of measurement |
| Comparative Example 3 | Ca. 20 | Ca. 15 | Ca. 30 | Ca. 25 |

What is claimed is:

1. An optical recording medium, comprising:
a substrate which transmits light, which has a main surface, and which has a groove defined in the main surface;
a recording layer formed on the main surface; and
a metal reflection layer formed on the recording layer,
wherein the recording layer is a thin film comprised of organic dye, contains at least one cyanine dye represented by general formula (I) as a main constituent, and is capable of corresponding to short-wavelength laser beam:

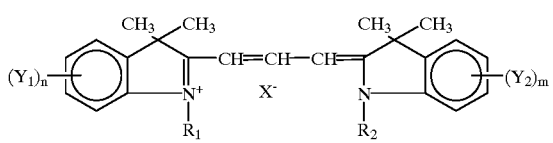

(I)

where X- represents an ion selected from the group consisting of an iodide ion, a bromide ion, a perchlorate ion, a borofluoride ion, a tetrafluorophosphate ion, a tetrafluoroantimonate ion, a methylsulfate ion or a methylbenzenesulfonate ion; one of $R_1$ or $R_2$ represents a $C_{3-18}$ substituent having an unsaturated bond, and another one of $R_1$ and $R_2$ represents a $C_{3-18}$ substituent having one of an unsaturated bond, an alkyl group, an aryl group or an alkoxy group; $Y_1$ and $Y_2$ respectively represent a hydrogen atom, an alkyl group, an aryl group, an alkoxy group, a halogen atom, a nitro group, a hydroxyl group, a carboxyl group, a $—OCF_3$ group, a hydroxyalkyl group, a cyanovinyl group, an alkylcarbonyl, a carboxyalkyl group, an alkylcarbonyl, or a residue which is condensed with a benzene ring to form an optionally substituted naphthalene ring; n and m respectively represent an integer ranging from 1 to 4; and $(Y_1)n$ and $(Y_2)m$ respectively represent structures which are asymmetric each to one other in the cyanine dye module.

2. The optical recording medium as claimed in claim 1, wherein one of $R_1$ and $R_2$ is a $C_{3-18}$ substituent having an unsaturated bond, and another one of $R_1$ and $R_2$ is one of an alkyl group, an aryl group or an alkoxy group.

3. The optical recording medium as claimed in claim 1, where in both $R_1$ and $R_2$ represent a $C_{3-18}$ substituent having an unsaturated bond.

4. The optical recording medium as clamed in claims 1, wherein the $C_{3-18}$ substituent having an unsaturated bond represented by $R_1$ or $R_2$ has an end, and wherein the end has one of a vinyl group (ethenyl group) or a phenylvinyl group (phenylethenyl group).

5. The optical recording medium as claimed in claim 1, wherein one of $R_1$ or $R_2$ is a $C_{3-18}$ substituent having an unsaturated bond, and another one of $R_1$ and $R_2$ is a $C_{3-18}$ substituent having one of an unsaturated bond, a $C_{1-18}$ alkyl group, a $C_6$ aryl group or a $C_{1-18}$ alkoxy group; and $Y_1$ and $Y_2$ respectively represent one of a hydrogen atom, a $C_{1-18}$ alkyl group, a $C_6$ aryl group, a $C_{1-18}$ alkoxy group, a halogen atom, a nitro group, a hydroxyl group, a carboxyl group, a $—OCF_3$ group, a $—R_3OH$ group, a $—R_3COOR_4$ group, a $—CH=CHCN$ group, a $—COOR_4$ group, a $—R_3COOH$ group, a $—COR_3$ group ($R_3$ is a $C_{1-9}$ alkylene group, and $R_4$ is a $C_{1-9}$ alkylene group) or a residue which is condensed with a benzene ring to form an optionally substituted naphthalene ring.

6. The optical recording medium as claimed in claim 1, wherein the at least one cyanine dye represented by the general formula (I) is a combined system containing at least two cyanine dyes.

7. The optical recording medium as claimed in claim 1, wherein the recording layer contains at least 1% of an oxygen quencher.

8. The optical recording medium as claimed in claim 1, wherein the metal reflection layer is a thin film comprised of one of a single metal or an alloy, has a high melting point, has a light reflectance of at least 55% to short-wavelength laser beam, and contains a metal selected from the group consisting of Al, Au, Ag, Cu, Ni, Ti and a chalcogenide metal.

9. The optical recording medium as claimed in claim 1, which is a single-sided optical recording medium, and which further comprises a protective layer provided on the metal reflection layer.

10. The optical recording medium as claimed in claim 9, which is a laminated structure and which further comprises a non-grooved substrate adhered to the single-sided substrate by an adhesive.

11. The optional recording medium as claimed in claim 1, which is a double-sided optical recording medium including two single-sided optical recording mediums each having a protective layer provided on the respective reflection layers thereof which are laminated together.

12. The optical recording medium as claimed in claim 1, wherein the optical recording medium is a double-sided optical recording medium, wherein the substrate has two main surfaces and a groove defined on each of the main surfaces during molding of the substrate, and wherein each of the main surfaces has a recording layer formed thereon, a metal reflection layer formed on the recording layer, and a protective layer provided on the metal reflection layer.

* * * * *